United States Patent [19]
Saito et al.

[11] 3,962,006
[45] June 8, 1976

[54] COLLAPSIBLE THERMOPLASTIC TUBULAR CONTAINER AND METHOD OF PRODUCING THE SAME

[75] Inventors: Tadao Saito; Isamu Ito, both of Tokyo, Japan

[73] Assignee: Yoshino Kogyosho Co., Ltd., Tokyo, Japan

[22] Filed: June 23, 1975

[21] Appl. No.: 589,720

Related U.S. Application Data

[62] Division of Ser. No. 460,919, April 15, 1974.

[30] Foreign Application Priority Data

Apr. 23, 1973 Japan................................ 48-45975

[52] U.S. Cl.................................. 156/69; 156/258; 156/244; 156/262; 156/306; 264/152; 264/DIG. 41
[51] Int. Cl.²......................................... B29C 27/02
[58] Field of Search ............. 222/107; 156/69, 306, 156/244, 258, 262; 264/DIG. 41, 152

[56] References Cited
UNITED STATES PATENTS 3,074,837  1/1963  Flax ...................... 156/69
3,700,513  10/1972  Haberhauer et al................. 156/69

*Primary Examiner*—Edward G. Whitby

[57] ABSTRACT

A tubular container having a collapsible body welded to a head member, and a method of producing the same.

The collapsible body and the head member are made of laminated films having impermeable layers therein, the impermeable layers of the body and the head member abutting or overlapping each other to form an impermeable layer of the shoulder portion thereby minimizing penetration or permeation of oil components, perfumes, etc. contained in the contents of the container or infiltration of oxygen into the container.

The method of producing the aforementioned container comprises the steps of continuously extruding thermoplastic resin with an impermeable layer, cutting the resin to form a disc, welding the open end of the sleeve to close it, and forming a head member by pressing.

3 Claims, 9 Drawing Figures

FIG 5.A
FIG 5.B
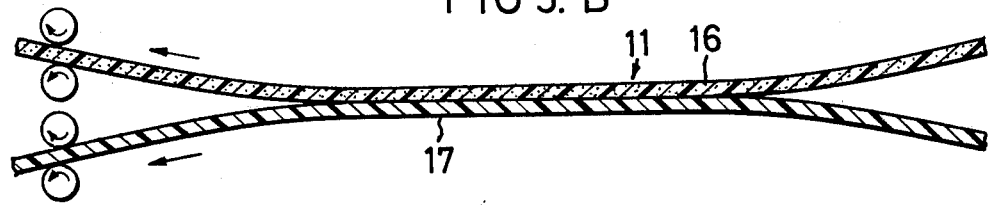
FIG 5.C
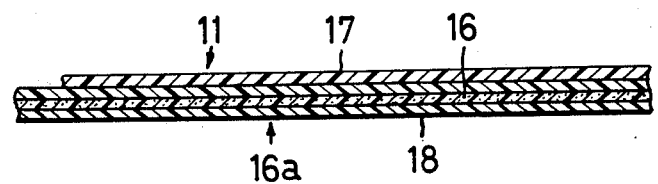
FIG 6.A
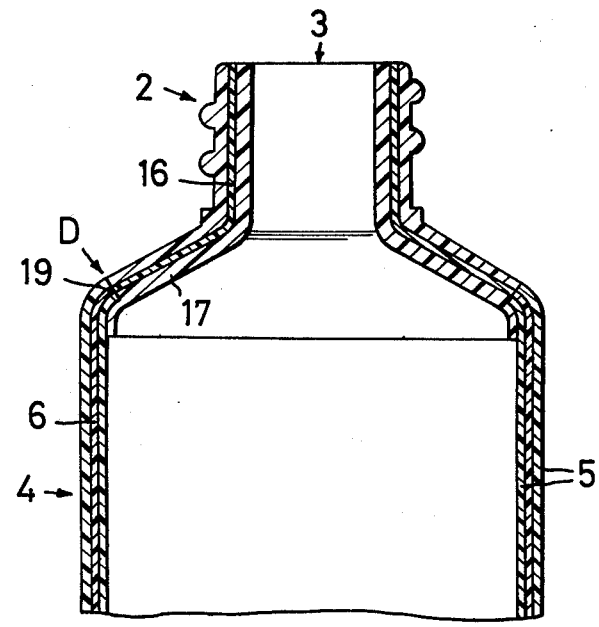

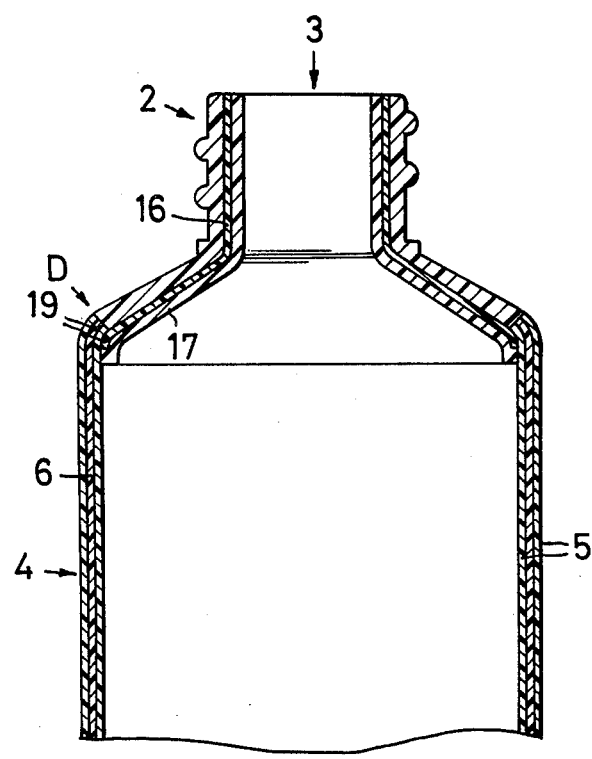

COLLAPSIBLE THERMOPLASTIC TUBULAR CONTAINER AND METHOD OF PRODUCING THE SAME

This is a division of application Ser. No. 460,919, filed Apr. 15, 1974.

BACKGROUND OF THE INVENTION

This invention relates to a collapsible tubular container and, more particularly, to a tube formed from an impermeable laminated material and a method of producing the same.

A conventional tubular container made of polyethylene, etc. excellent in water resistance has a disadvantage in that it is susceptible to penetration or permeation of oil components or perfumes contained in its contents or to infiltration of oxygen thereinto, resulting in deterioration of the contents. Therefore, it is a usual practice to use a tubular container formed of a laminated film having an internal or intermediate impermeable layer.

However, in this case, the tubular container has a head member separately produced which is joined to the container at its one end to provide an outlet for the contents. Therefore, it cannot be expected that the container of this type may totally prevent deterioration of the contents due to permeation or penetration of the contents or due to infiltration of oxygen through the head member.

As a result, a tubular container provided at its head member with an impermeable layer has been introduced to overcome the above-mentioned disadvantage. In this case, the impermeable layer portion is produced separately from the tube body and or the head member. When the head member is formed, the impermeable layer previously prepared is placed in a cavity between the female mold and the mandrel and on the mandrel and is incorporated into the head member which is formed by filling the cavity with molten thermoplastic resin. In another example, the impermeable layer previously prepared is welded to the inside surface of the head member, which is in turn welded to the tube body. These examples are found in Japanese Pat. No. 48583/72. However, the tubular container thus produced has a disadvantage in that a thermoplastic resin layer, which welds together the head member and the tube body, is inevitably formed between the impermeable layers of the head member and the tube body, and therefore, permeation or penetration of the contents, infiltration of oxygen, permeation of perfumes, etc. may inevitably occur through the above-mentioned thermoplastic resin layer joint resulting in deterioration of the contents or the value of the products. In addition, since the impermeable layer is separately produced and the impermeable layer insert tends to be improperly positioned when the head member is welded or formed, defective products are often produced and, in addition, productivity of the tubular container is greatly decreased due to the complicated production processes.

The Japanese Pat. No. 23485/63 teaches a method of producing a thermoplastic tubular container, which closes the end of a tubular thermoplastic material by welding thereto a disc cut out of a molten thermoplastic material. The container thus produced has a disadvantage in that the body and the head member thereof is made of a material such as polyethylene, and therefore, deterioration of the contents thereof cannot be prevented and the productivity thereof is not high.

SUMMARY OF THE INVENTION

The present invention, therefore, contemplates the provision of an improved container and a method of producing the same, eliminating disadvantages of the containers and the production methods thereof of the prior art.

One of the objects of the present invention is to provide a tubular container having impermeable layers formed in the body, head and shoulder portions which can prevent permeation or penetration of oil components, perfumes, etc. in the contents or infiltration of oxygen from outside, thereby to effectively protect the contents of the container.

Another object of the present invention is to provide a tubular container in which the impermeable layers of the body and the head portions abut or overlap each other at the junction to form an impermeable layer at the shoulder portion.

A further object of the present invention is to provide a method of producing a tubular container, which has the steps of extruding continuously thermoplastic resin material provided with an impermeable layer, continuously cutting out discs by pressing, and forming a head member by welding and closing the open end of the sleeve, and which is high in productivity in the mass production.

A still further object of the present invention is to provide a method of producing a tubular container, in which a laminated thermoplastic resin sleeve having an impermeable layer to weld and close the open end of the sleeve and, simultaneously, the impermeable layers of both parts abut or overlap each other to form an impermeable layer at the junction.

Another object of the present invention is to provide a method of producing a tubular container, which fuses the peripheral wall of the opening of the sleeve under the influence of the latent heat of the disc thereby to weld the sleeve to the disc.

Another object of the present invention is to provide an economical method of producing a tubular container, in which a laminated film having a single impermeable layer or the single impermeable layer and the thermoplastic resin layers are separately extruded, and are welded to each other when the disc is cut out, the residual of each resin layer being separated and recovered for re-use.

According to one aspect of the present invention, there is provided a tubular container comprising a laminated thermoplastic resin sleeve having an impermeable layer and a head member with an outlet adhering to one end of the sleeve, the head member consisting of at least two thermoplastic resin layers and an impermeable layer whose peripheral edge abuts against or overlaps the impermeable layer of the sleeve to form an impermeable layer at the junction of the sleeve and the head member.

According to another aspect of the present invention, there is provided a method of producing the above-mentioned tubular container comprising the step of cutting a disc out of a thermoplastic resin material and welding the disc to the open end of the sleeve to close it, where the thermoplastic resin material consisting of at least two resin layers and an impermeable layer is continuously extruded to form a disc by cutting, the disc is welded to the open end of the sleeve to close it, the impermeable layers of the disc and the sleeve abut or overlap each other to form an impermeable layer at the junction between the disc and the sleeve, and forming the head member in a pressing process using a female and a core.

According to still another aspect of the present invention, there is provided a method of producing the above-mentioned tubular container, in which each layer of the thermoplastic resin consisting of at least two layers and an impermeable layer is separately extruded and is welded to each other when the disc is cut out, and the disc is welded to the open end of the sleeve under the influence of latent heat to form the head member and close the open end.

According to a further aspect of the present invention, there is provided a method of producing the above-mentioned tubular container, in which the thermoplastic resin consisting of at least two layers one of which is a laminated film having an impermeable layer is produced by continuously extruding said laminated film together with a molten resin layer material to form a disc by cutting, and the disc is welded to the open end of the sleeve closing it.

BRIEF DESCRIPTION OF THE DRAWINGS

Other and further objects, features and advantages of the present invention will be more apparent from the following description in connection with the following drawings wherein:

FIGS. 5A, 5B and 5C are sectional views showing examples of thermoplastic resin material; and FIGS. 6A and 6B are longitudinal sectional views showing the junction between the tube body and the head member of tubular containers according to the present invention.

DESCRIPTION OF THE PREFERRED EMBODIMENTS

Figure 1:
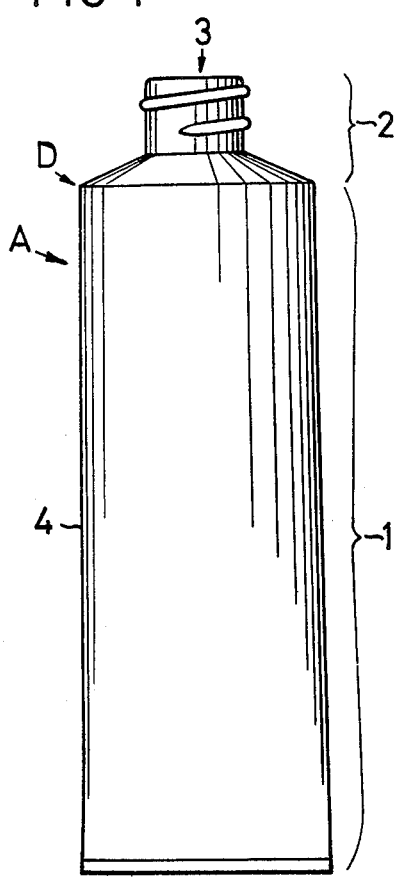
FIG. 1 is an elevational view of a tubular container according to the present invention.

In the above-mentioned figures, like reference numerals and characters designate like or corresponding parts throughout.

Figure 2:
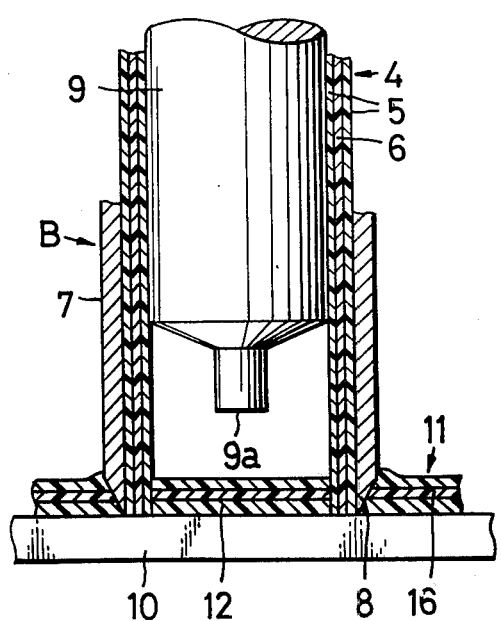
FIG. 2 is a longitudinal sectional view of a casting die for producing a tubular container of the present invention.
Figure 3:
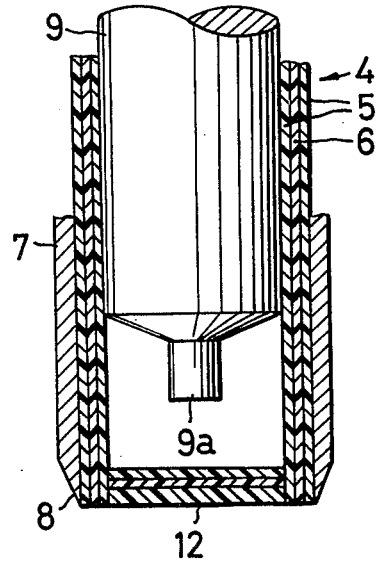
FIG. 3 is an elevational sectional view of a casting die for use in the present invention, showing a disc cut out and welded to the sleeve.
Figure 4:
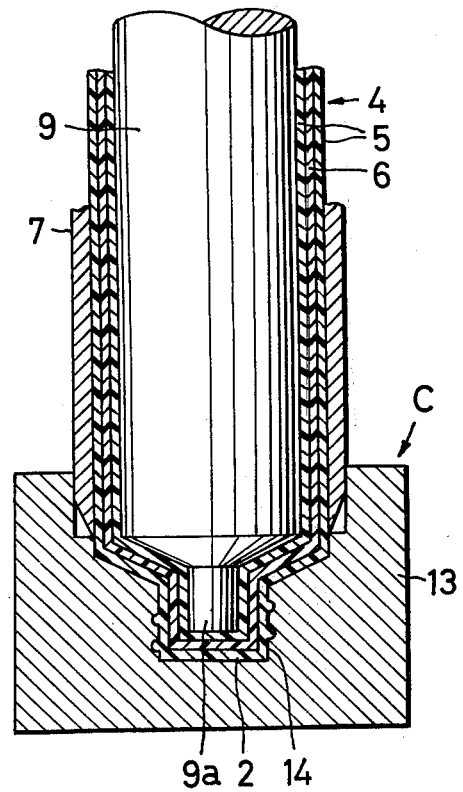
FIG. 4 is a longitudinal sectional view of a mold core for forming a head member according to the present invention.

Now referring first to FIG. 1, there is shown an elevational view of a tubular container according to the present invention, Numeral 1 designates the tube body of the tubular container. A head member 2 having an outlet 3 for the contents of the container is welded to the tube body 1. A sleeve 4 constituting the tube body 1 is cylindrical and consists of a laminated film of at least two layers including a thermoplastic resin layer 5 and an impermeable layer 6 shown in FIGS. 2, 3 4 and 6. The thermoplastic resin layer 5 is made of, for instance, polyethylene easily collpsible and impermeable to water. The impermeable layer 6 is provided at the inside of the layer 5 or between the layers 5, and is made of, for instance, nylon, polypropylene, polyamide poval, aluminum foil, etc. which have excellent perfume-impermeability and can prevent product quality deterioration due to permeation or penetration of the contents or infiltration of oxygen. As shown in FIG. 2, the sleeve 4 is inserted into and supported between a tubular member 7 of the cutting die B equipped at its lower end with a cutting edge 8 and a core 9 inserted vertically-movable into the tubular member 7 with their axes in alignment. A lowering movement of the tubular member 7 cuts molten thermoplastic resin material 11 pressed on a metal plate 10 to form a disc 12. Since this disc 12 is placed on the metal plate 10, it is fitted into the sleeve 4 simultaneously when it is cut out. Then the peripheral edge of the disc 12 is welded to the inside surface of the wall of the sleeve under the influence of the latent heat of the disc 12 to close the open end of the sleeve 4 (See FIG. 3). As shown in FIG. 4, the sleeve 4 and the disc 12 thus welded are place in a pressing device C which includes a female mold 13 equipped with a cavity 14, and a core 9 having a leading end 9a. The cavity 14 is so shaped that it may form a head member 2 in cooperation with the leading end 9a of the core 9. In the pressing process, the core 9 is lowered to expand the disc 12 to a desired shape thereby to form a head portion. Then an outlet 3 for the contents are opened at the head portion and thus a tubular container A is obtained as shown in FIG. 1.

The thermoplastic resin film 11 is made of at least two different layers including an impermeable layer 16. Each of them is separately extruded from an extrusion or injection molding machine onto the metal plate 10. At least one of the layers of the thermoplastic resin film 11 is at a molten state and is at a temperature where its latent heat can weld itself to the wall surface of the sleeve or to other layers. In addition, the tubular member 7 supporting the sleeve 4 is mounted in a device which can vertically move it in accordance with the extruding rate of the thermoplastic resin 11 to cut and form discs and then transfer it to the expansion process shown in FIG. 4 thereby continuously carrying out closing of the sleeve 4 and forming of the head member 2.

As shown in FIG. 5A, the thermoplastic resin film 11 may consist of two different layers including an impermeable layer 16 of nylon, poval, etc. which is excellent in perfume-impermeability and can prevent permeation or penetration of the contents or infiltration of oxygen and a complementary layer 17 provided at the upper or lower side of the impermeable layer 16. Either of these two layers is extruded in a molten state.

As shown in FIG. 5B, the impermeable layer 16 and the resin layer 17 may be separately extruded. Discs are cut out from a solid layer. When the disc is welded to the molten layer, the disc made of the solid layer is fused under the influence of the latent heat of the molten layer and adheres to the sleeve 4. After discs are cut out, the residual resin is separated and recovered for re-use by suitable means. In this case, either of these two resin layers is made as an impermeable layer.

As shown in FIG. 5C, the thermoplastic resin film 11 may be made up of a laminated resin 16a having an impermeable layer 16 at the inside of or between the polyethylene layer 18 and a molten resin layer 17. These two layers 16a and 17 are extruded from a suitable machine. Thus the discs are cut out of the thermoplastic resin film 11.

FIGS. 6A and 6B show sectional views of the junction D between the tube body 1 and the head member 2 of a tubular container A according to the present invention.

In the embodiment shown in FIG. 6A, the sleeve 4 consisting of a laminated film having an intermediate impermeable layer 6 and a head member 2 made up of a laminated thermoplastic resin film 11 with an intermediate impermeable layer 16 are joined together so that both impermeable layers 6 and 16 abut each other. The skirt portion of the molten resin layer 17 of the head member fuses the inside surface of the tube body 4 and welds thereto, so that both impermeable layers 6 and 16 abut each other at the junction D to form an impermeable layer 19.

In an embodiment shown in FIG. 6B, the tube body 1 consists of the same laminated film with an intermediate impermeable layer 6 like that of the above-mentioned embodiment. In this case, the thermoplastic resin film 11 constituting the head member 2 is formed in a process in which, when the film is extruded, the upper layer thereof is a resin layer such as of polythylene and the lower layer thereof is a laminated film 16a having an intermediate impermeable layer 16. The impermeable layer 16 of the head member 2 as well as the skirt portion of the molten resin layer 17 overlaps and welds to the inside surface of the tube body, and the impermeable layer 6 of the body and the impermeable layer 16 of the head member overlaps each other to form an impermeable layer 19 at the junction D thereby preventing permeation or penetration of the contents, absorption of external oxygen, or dissipation of perfumes through the junction D.

The above-mentioned thermoplastic resin film constituting the sleeve and the head member is not limited to the laminated material mentioned above, but includes laminated material having a suitable inside or intermediate impermeable layer.

It should be understood from the foregoing description that the tubular container according to the present invention has a tube body and a head member both of which consist of laminated resin films having impermeable layers, and these impermeable layers of both the body and the head member abut or overlap each other to form an impermeable layer at the junction between the body and the head member, and therefore the tubular container according to the present invention can perfectly prevent permeation or pentration of the contents, infiltration of oxygen, dissipation of perfumes through the body and the head member, especially through the junction or shoulder and can thereby prevent deterioration of contents due to the aforementioned phenomena thus increasing its commercial value.

It should also be understood that the method of producing the tubular container according to the present invention employs a number of cutting dies each consisting of a tubular member and a core mounted on a rotating or transferring device and also employs pressing devices and, therefore, can continuously cut out discs from the thermoplastic resin film continuously extruded, can continuously fuse sleeves to close open ends thereof, can continuously form head members and thus can greatly increase productivity in mass production.

It should also be understood that the method of the present invention can weld together the disc and the sleeve by fusing the sleeve wall under the influence of the latent heat of the disc and, therefore, requires no special heating device thereby to simplify the construction of the equipment employed.

It should also be understood that the method of the present invention extrudes individual layers of the thermoplastic resin film separately and welds them together when discs are cut out, and then separates and recovers them for re-use and therefore is very economical.

What is claimed is:

1. A method of producing a tubular container, comprising the steps of:
    supporting a sleeve formed of a laminated resin with an impermeable layer between a tubular member and a core inserted in said tubular member;
    continuously extruding a molten thermoplastic resin film formed of at least two resin layers and having an impermeable layer;
    cutting a disc from said thermoplastic resin film;
    welding said disc to the open end of said sleeve under the influence of the latent heat of said disc and thereby closing said open end so that the impermeable layers of said disc and sleeve may come into contact with each other to form an impermeable layer at the junction between said disc and said sleeve; and
    forming a head member in a pressing process employing a female mold and said core.

2. A method of producing a tubular container, comprising the steps of:
    supporting a sleeve formed of a laminated resin with an impermeable layer between a tubular member and a core inserted in said tubular member;
    separately extruding thermoplastic resin film formed of at least two resin layers and having an impermeable layer;
    welding these layers to each other while cutting out a disc from said laminated resin;
    separating and recovering the residual layers of said film for re-use;
    welding said disc to the open end of said sleeve under the influence of latent heat of said disc and thereby closing said open end so that the impermeable layers of said disc and sleeve may come into contact with each other to form an impermeable layer at the junction between said disc and said sleeve; and forming a head member in a pressing process employing a female mold and said core.

3. A method of producing a tubular container, comprising the steps of:
    supporting a sleeve formed of a laminated resin with an impermeable layer between a tubular member and a core inserted in said tubular member;
    continuously extruding a thermoplastic resin film together with a molten resin layer, said thermoplastic resin film consisting of at least two different layers including a laminated resin film having an impermeable layer;
    cutting out a disc from said thermoplastic resin film;
    welding said disc to the open end of said sleeve under the influence of the latent heat of said disc and thereby closing said open end so that the impermeable layers of said sleeve and disc may come into contact with each other to form an impermeable layer at the junction between said disc and sleeve; and
    forming a head member in a pressing process employing a female mold and said core.

* * * * *